Feb. 2, 1954     I. JEPSON ET AL     2,667,966
SHIPPING AND DISPLAY CASE FOR SHAVERS AND THE LIKE
Filed March 9, 1950     3 Sheets-Sheet 1

Inventors:
Ivar Jepson
Frank E. Cerveny
By McCanna & Morsbach
Attys.

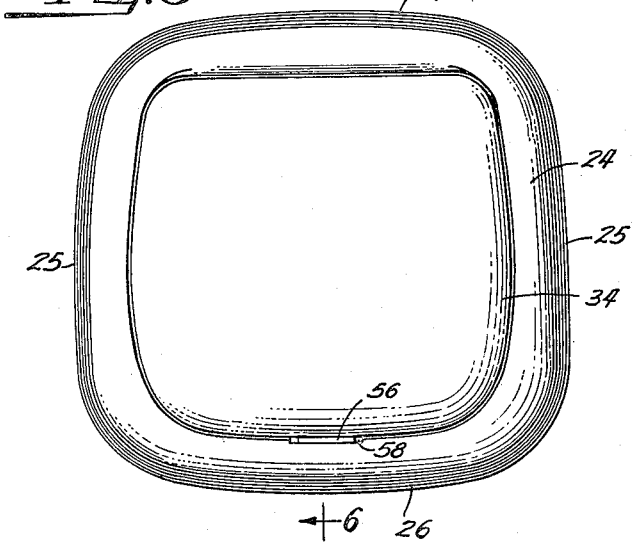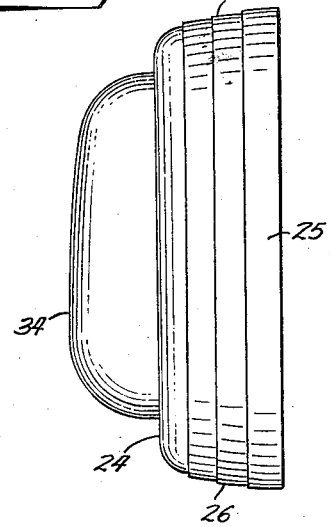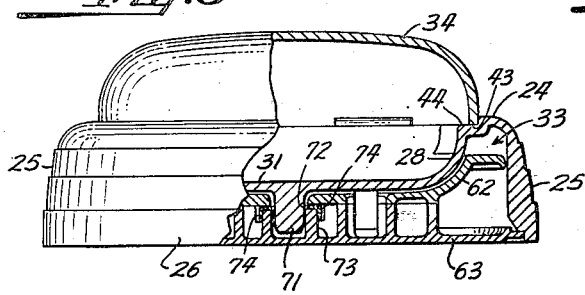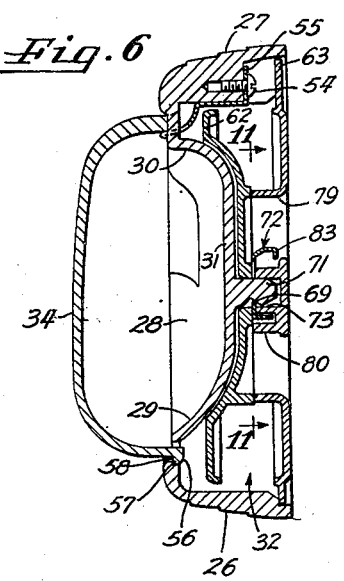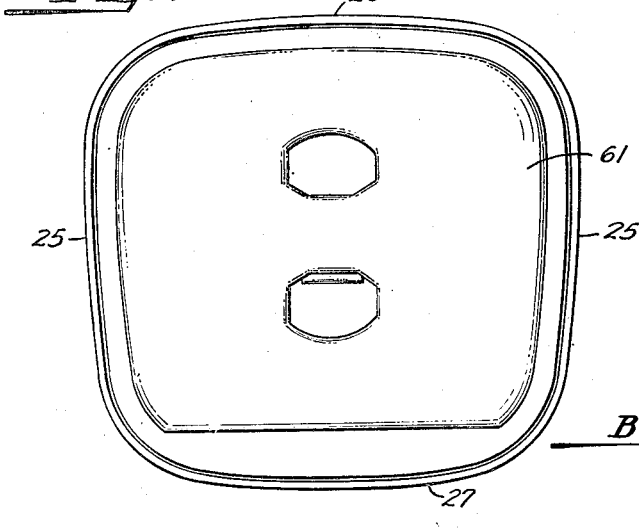

Feb. 2, 1954        I. JEPSON ET AL        2,667,966
SHIPPING AND DISPLAY CASE FOR SHAVERS AND THE LIKE
Filed March 9, 1950        3 Sheets-Sheet 3
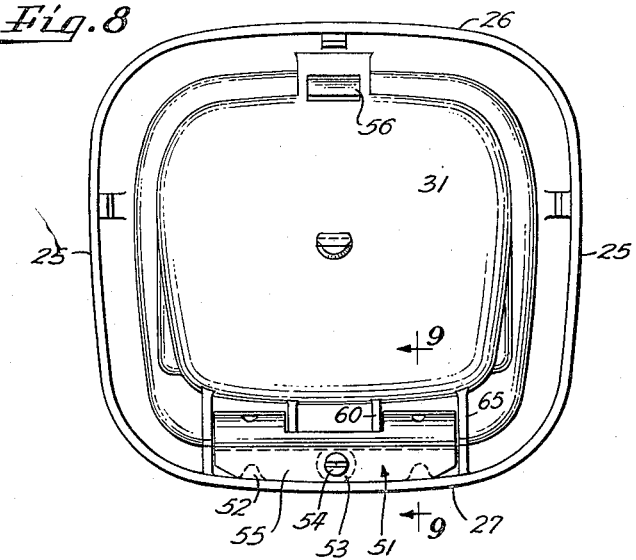
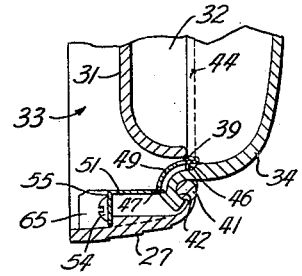
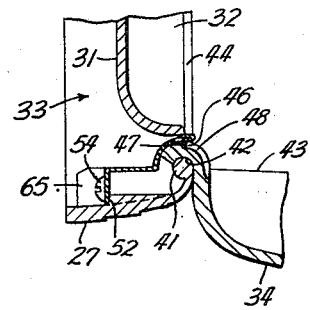
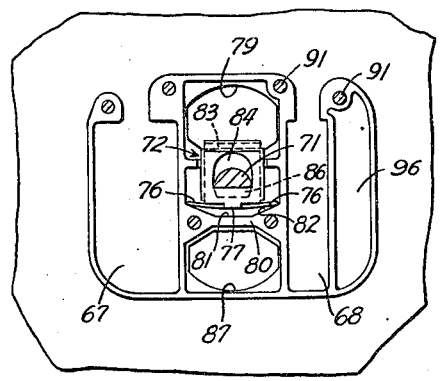
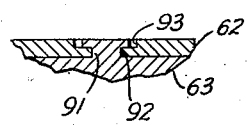

Patented Feb. 2, 1954

2,667,966

UNITED STATES PATENT OFFICE 2,667,966

SHIPPING AND DISPLAY CASE FOR SHAVERS AND THE LIKE

Ivar Jepson, Oak Park, and Frank E. Cerveny, Berwyn, Ill., assignors to Sunbeam Corporation, Chicago, Ill., a corporation of Illinois Application March 9, 1950, Serial No. 148,581

2 Claims. (Cl. 206—16)

This invention relates to a display and storage case for an electrical appliance and more particularly to a display and storage case for an electric dry shaver.

From an economic standpoint in the merchandising of electric dry shavers, it is desirable to package the shaver in a package that may serve as a shipping package, as a display case for displaying the shaver and as a holder adapted for holding or storing the shaver for everyday use. The packaging of the attachment or power supply cord with the shaver presents a problem since it must be conveniently located to be readily accessible by the user of the shaver and yet must not detract from the attractiveness of the shaver and case when the latter is used for display purposes.

One of the objects of the invention is to provide an improved display and storage case that is capable of serving as a shipping package for a shaver and its power attachment cord, that provides an attractive medium for displaying the shaver and that serves as a convenient means for supporting and protecting the shaver against injury when it is not being used.

Another object of the invention is the provision of a display and storage case having novel means for storing the attachment cord.

Another object of the invention is the provision of a display and storage case having novel means for hinging the cover to the body portion and for locking the cover in a closed position.

Another object of the invention is the provision of a novel display and storage case of the above character that is simple to construct, that has a minimum of parts, that is easy to assemble and is relatively inexpensive to produce.

Other objects and advantages of the invention will become apparent from the following detailed description taken in connection with the accompanying drawings, in which—

Fig. 3 is a top view of the case with the cover closed;

Fig. 4 is a side view;

Fig. 5 is a front view with portions cut away to show the details of construction;

Fig. 6 is a sectional view taken substantially along the line 6—6 of Fig. 3;

Fig. 7 is a bottom view of the display and storage case;

Fig. 8 is a bottom view of the display and storage case with the reel removed;

Fig. 9 is a sectional view taken substantially along the line 9—9 of Fig. 8;

Fig. 10 is a view similar to Fig. 9 with the cover in an open position;

Fig. 11 is a sectional view taken substantially along the line 11—11 of Fig. 6, and Fig. 12 is a sectional view taken substantially along the line 12—12 of Fig. 2.

Figure 1:
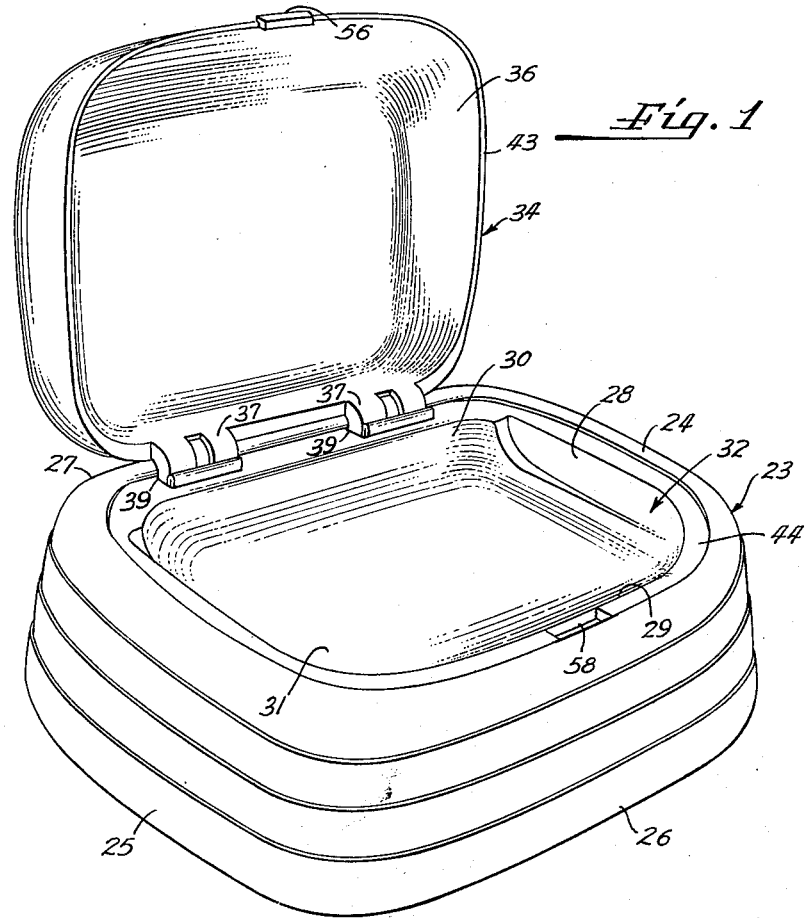
Figure 1 is a perspective view of a display and storage case embodying the present invention.

The invention is shown embodied in a combined storage and display case for an electric dry shaver or appliance, not shown, having a generally rectangular configuration and utilizing a detachable attachment or power supply cord 20, having a conventional attachment plug 21 for connecting the shaver to a power source and a plug 22 for connection with the shaver.

In general, the display case comprises a body 23 formed of synthetic resinous or other suitable material having a top portion 24 and a depending peripheral flange portion defining spaced sides 25, a front 26 and a back 27 which support the top portion 24. The exterior surface of the sides and ends may be ornamented as shown. Spaced inwardly from the sides 25 of the case are depending walls 28 and spaced inwardly from the front and back are depending walls 29 and 30. The walls 28, 29 and 30 are interconnected at a position intermediate the top portion 24 and the lower edge of the body by a member 31 to define a bottom for an upwardly facing appliance receiving recess or cavity 32 and a top for a downwardly facing chamber 33. The recess 32 is of such configuration and depth that it forms a nest for the shaver wherein the latter may be supported in a horizontal position with the upper portion of the shaver extending above the top portion 24.

A cover 34 having a recess 36 of a shape complemental to the upper portion of the shaver is mounted on the body 23 by a suitable hinge mounting so that the cover is movable between a closed position (see Figs. 5 and 6) so that the shaver is completely encased in the case and an open position (see Figure 1) in which the cover is in a substantially perpendicular relation to the body and the shaver is on display. The hinge mounting in this embodiment of the invention includes a pair of spaced tabs 37 (see Figures 1, 9 and 10) extending downwardly from the rear wall of the cover 34 and shaped to project through slots 39 at the back edge of the top portion 24. The extreme rear edge 41 defining each slot 39 is formed with a horizontally disposed arcuate or beaded portion while the tabs 37 are formed with outwardly facing bearing recesses 42 shaped to receive the beaded portions 41 so as to permit swinging movement of the cover 34 between the open and closed positions.

The closed position of the cover 34 is defined by engagement of the lower edge 43 of the cover 34 with a ledge or seat 44 embracing the appliance recess 32. The open position of the cover is defined by engagement of projections 46 with the ends 47 of grooves 48. The grooves 48 are formed on the tabs 37 on the surface thereof opposite the bearing recess 42 (see Fig. 10) and extend arcuately about the hinge axis. The projections 46 are formed by tongues struck out of the ears 49, formed on a retaining plate 51, and received in the slots 39 in front of the tabs 37. The ears 49 are shaped to define an arcuate surface in spaced parallel relation to the surfaces of the beaded portions 41, the spacing between the arcuate surface and beaded portion 41 being such as to permit the reception of tabs 37 therebetween, while at the same time insuring freedom of movement of the cover between the open and closed positions. The extreme ends of the ears may be folded back upon themselves as shown in Figs. 9 and 10 to increase the rigidity of the structure. The grooves 48 are of such length that the projections 46 engage the ends 47 when the cover is in a substantially vertical or upright position (see Figure 1). The plate 51 is secured in position on the underside of the body by spaced shoulders 52, a boss 53 intermediate the shoulders and a screw 54 extending through a flange portion 55 of the plate and threadably received in the boss 53. Spaced ribs 60 and 65 between the back wall 27 of the case and the back wall 30 of the appliance recess 32, adjacent the inner and outer sides of the ears 49, serve as guides to facilitate positioning the plate 51 during assembly of the case and also serve to reinforce the case structure. The friction between the ears 49 and the tabs 37 is such as to hold the cover at any preselected partially opened position.

The cover is maintained in a closed position by engagement of a projection 56 with a notch 57 formed on the underside of the top 24 as best seen in Fig. 6. The notch 57 is in communication with a slot 58 at the front of the top portion 24 and is shaped to receive the projection 56 formed on the lower edge of the front wall of the cover. The cover is constructed so that upon slight compressive force being applied between the front and back of the cover the projection 56 is positioned to pass readily through the slot 58. Release of the compressive force after the passage of the projection 56 through the slot 58 permits the cover to expand so that the projection 56 seats in the notch 57 to lock or secure the cover in a closed position. To effect release of the cover a slight compressive force is applied between the front and the back of the cover to move the projection out of the notch 57 and to permit passage of the projection 56 through the slot 58. While a number of materials may be used for forming the cover as will be apparent to those skilled in the art, synthetic resinous material, such as "nylon" sold by E. I. du Pont de Nemours & Co., has been found to be satisfactory since it permits of ready forming and a thin walled construction having the necessary resiliency to return to its original configuration after the application of a slight deforming force applied thereto.

Figure 2:
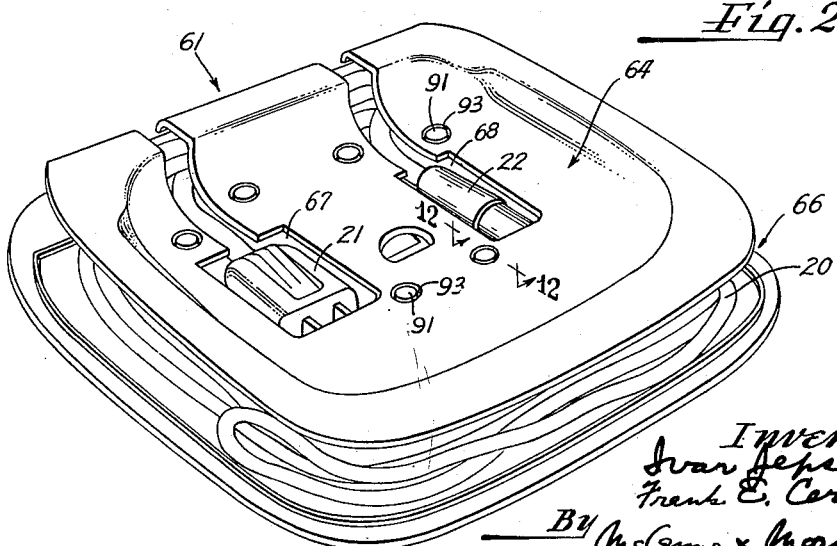
Fig. 2 is a perspective view of a reel for the attachment cord.

Another aspect of the invention is concerned with novel means that provides for storing the attachment cord 20 while at the same time permitting ready accessibility thereto. In this embodiment of the invention the cord 20 is adapted to be wound around a reel 61 shaped to be readily received in and removed from the chamber 33. As best seen in Figs. 2, 5 and 6 in this embodiment of the invention the reel is formed by two members 62 and 63 secured together to define a hub portion 64 and a grooved peripheral or sheave portion 66. On one side of the reel the sheave portion of the member 62 extends outwardly beyond the face of the hub so as to in effect define a cavity for receiving the bottom 31 of the shaver recess 32 when the reel 61 is received in the chamber 33. The opposite side of the reel is substantially smooth so that when the reel is received in the chamber 33 the smooth side forms a bottom for the case. The hub portion 64 of the reel is formed with recesses 67 and 68 in communication with the groove on the periphery of the reel and are preshaped for receiving the attachment plugs 21 and 22 at opposite ends of the cord 20. The recesses are sufficiently deep so that the plugs are disposed completely therein as shown in Figure 1.

Provision is made for releasably securing the reel in the chamber 33. For this purpose latch means are provided on the reel to be engageable with a notch 69 in a projection or post 71 formed on the bottom 31 and extending into the chamber 33. The latch means includes a plate 72 in face to face relation with the top member 62 (see Fig. 5) of the reel and rests on an upstanding boss 73 formed on the lower member 63 of the reel and having an aperture for receiving the post 71. The upper edge of the boss 73 is spaced from the face of the member 62 to permit reception and sliding movement of the plate 72. Downturned flanges 74 on the side edges of the plate 72 are engageable with the sides of the boss 73 to guide and maintain the plate 72 in assembled relation. At one end the plate 72 is formed with resilient downturned wing portions 76 (see Figs. 6 and 11) extending outwardly from the central point of connection 77 with the plate 72. The wing portions are in side by side relation with a transversely extending upstanding rib 80 formed on the member 63 between the attachment plug recesses 67 and 68 and having a smooth central portion 81 spaced from the connection 77 and end portions 82 inclining from the central portion 81 toward the wing portions 76. The opposite end of the plate is formed with a downturned flange 83 accessible from a recess 79 on the side of the reel opposite and between the recesses 67 and 68 and shaped to permit the reception of a finger or thumb. Disposed centrally of the plate is an elongated hole 84 for receiving the post 71. An edge 86 defining one side of the hole 84 is shaped to be received in the notch 69 to maintain the reel in assembled relation with the case when the plate 72 is in the position shown in Fig. 11. Due to the resiliency of the wings 76 they normally tend to assume the position shown in Fig. 11 so that the edge 86 is normally held in its engaging or locking position. To effect release of the latch means the thumb and finger are inserted in the recess 79 and a recess 87 adjacent the rib 80 and between the recesses 67 and 68 so that a force can be applied between the flange 83 and the rib 80 to compress the wing portions 76 into face to face touching contact with the inclined surfaces 82 and thereby move the plate 72 against the spring action of the wings 76 and move the edge 86 out of the notch, thereby permitting the reel to be withdrawn from the chamber 33. The plate 82 returns to its initial position as soon as the release force is removed.

The reel may also be formed of synthetic resinous materials. When such materials are used, the members 62 and 63 may be secured together by joints such as shown in Fig. 12 in which one of the members 62 or 63 is formed with a projection or pin 91 shaped to extend through mating apertures 92 in the other member. When the members are assembled the pins are deformed into the recesses 93 encircling the apertures to secure the members together. Where synthetic resinous materials or the like are used the parts may be cored as at 96 to minimize manufacturing costs and weight of the finished product. To wind the attachment cord on the reel the user first places the attachment plugs 21 and 22 in the respective recesses 67 and 68, then winds the cord about the sheave portion of the reel 61 as shown in Fig. 2. To insert the reel in the body the reel is positioned so that the post 71 is received in the aperture in the boss 73. As the post is being received in the apertured boss the user applies a squeezing force between the rib 80 and the downturned flange 83 so that the plate 72 is positioned to have the aperture 84 in registration with the aperture in the boss 73. When the reel is in the position shown in Fig. 5 the squeezing force is removed and the edge 86 is urged into the notch 69 on the post 71 by the wings 76 acting against the inclined surfaces 82 to secure the reel 61 in the chamber 33.

This construction is extremely simple to make since the cover, the body and the members 62 and 63 may be formed as moldings. This construction is also advantageous in that it permits of easy assembly in the factory. Thus, for example to assemble the cover 34 and body 23 the assemblyman inserts the tabs 37 into the slots 39 so that the recesses 42 receive the beaded portions 41. The plate 51 is then positioned from the bottom of the body so that the ears 49 extend through the slots 39 and the projections 46 are received in the grooves 48. The screw 54 is then threaded into the boss 53 to secure the plate 51 in position.

This construction has many advantages. It not only provides a case that may be used for packaging a shaver and cord but also a case that can be used to display the shaver and store it for everyday use. The hinge construction, locking construction and the use of synthetic resinous materials permit of light weight inexpensive construction having a minimum number of parts.

While we have shown one embodiment of our invention it will be understood that we do not wish to be limited thereto since many modifications may be made and we therefore contemplate by the claims to cover such modifications as fall within the true spirit and scope of our invention.

We claim:

1. A storage and display case for an electrical appliance having a detachable power cord, comprising a body having an upwardly facing recess for the reception of the appliance and a downwardly facing chamber for the reception of said power cord, a cover for said upwardly facing recess to enclose an appliance disposed therein, hinge means hinging said cover to said body, a projection attached to said body extending inwardly of the downwardly facing chamber and having a transverse notch formed in one side thereof, a reel for said cord disposed in said downwardly facing chamber, and releasable latch means on said reel engaged with said notch on said projection detachably and non-rotatably to secure said reel in said chamber.

2. A storage and display case for an electrical appliance having a detachable power cord, comprising a body having an upwardly facing recess for the reception of the appliance and a downwardly facing chamber, a cover for closing said upwardly facing recess to enclose an appliance disposed therein, hinge means hinging said cover to said body, a projection attached to said body extending inwardly of the downwardly facing chamber and having a notch formed thereon, a reel for said cord disposed in said downwardly facing chamber, said reel including a slidable plate having an aperture therein receiving said projection, resilient means for biasing said plate into locking engagement with said notch to lock said reel in said chamber, and manually actuable means for slidably moving said plate out of locking engagement with said notch.

IVAR JEPSON.
FRANK E. CERVENY.

References Cited in the file of this patent

UNITED STATES PATENTS

| Number | Name | Date |
|---|---|---|
| 959,781 | Moyer | May 31, 1910 |
| 1,132,065 | Bernhard | Mar. 16, 1915 |
| 1,532,177 | Gist | Apr. 7, 1925 |
| 1,938,159 | Stewart | Dec. 5, 1933 |
| 2,143,529 | White | Jan. 10, 1939 |
| 2,157,257 | Crum | May 9, 1939 |
| 2,200,399 | Primas | May 14, 1940 |
| 2,372,969 | Michals | Apr. 3, 1945 |
| 2,418,578 | Crane | Apr. 8, 1947 |
| 2,458,721 | Nenno | Jan. 11, 1949 |
| 2,461,711 | Wewetzer | Feb. 15, 1949 |
| 2,474,899 | Hutt | July 5, 1949 |
| 2,494,359 | Roth | Jan. 10, 1950 |